US006404431B1

United States Patent
Farmer

(10) Patent No.: US 6,404,431 B1
(45) Date of Patent: Jun. 11, 2002

(54) VIRTUAL MAP STORE/CARTOGRAPHIC PROCESSOR

(75) Inventor: Randolph Gregory Farmer, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 40 days.

(21) Appl. No.: 09/059,123

(22) Filed: Apr. 13, 1998

(51) Int. Cl.[7] .............................................. G06T 17/00
(52) U.S. Cl. ...................................................... 345/428
(58) Field of Search ................................ 245/418, 419, 245/425, 428, 429

(56) References Cited

U.S. PATENT DOCUMENTS

| | | | |
|---|---|---|---|
| 4,086,632 A | 4/1978 | Lions ........................... 364/444 |
| 4,435,777 A | 3/1984 | McCaskill et al. .......... 364/900 |
| 4,462,042 A | 7/1984 | Reymond et al. ............. 358/22 |
| 4,682,160 A | 7/1987 | Beckwith, Jr. et al. ...... 340/729 |
| 4,729,127 A | 3/1988 | Chan et al. ................... 382/56 |
| 4,755,956 A | 7/1988 | Porawski ..................... 364/518 |
| 4,791,572 A | 12/1988 | Green, III et al. .......... 364/449 |
| 4,825,381 A | 4/1989 | Bottorf et al. .............. 364/443 |
| 4,827,419 A | 5/1989 | Selby, III ..................... 364/443 |
| 4,845,631 A | 7/1989 | Bottorf ........................ 364/443 |
| 4,873,513 A | 10/1989 | Soults et al. ................ 340/723 |
| 4,899,293 A | 2/1990 | Dawson et al. ............. 364/521 |
| 4,965,845 A | 10/1990 | Chan et al. ................... 382/56 |
| 4,984,279 A | 1/1991 | Kidney et al. .................. 382/1 |
| 5,140,532 A | 8/1992 | Beckwith, Jr. et al. ..... 395/101 |
| 5,179,638 A | 1/1993 | Dawson et al. ............. 395/125 |
| 5,187,754 A | 2/1993 | Currin et al. ................. 382/54 |
| 5,224,181 A | 6/1993 | Tsutsumi ...................... 382/61 |
| 5,325,449 A | 6/1994 | Burt et al. .................... 382/56 |
| 5,335,181 A | 8/1994 | McGuffin ................... 364/443 |

Primary Examiner—Cliff N. Vo
(74) Attorney, Agent, or Firm—Terry J. Anderson; Karl J. Hoch, Jr.

(57) ABSTRACT

A digital map system has a storage device for storing digital map data and a cartographic processor for generating maps utilizing digital map data from the storage device. The cartographic processor is configured to generate maps in a plurality of different formats.

12 Claims, 1 Drawing Sheet

VIRTUAL MAP STORE/CARTOGRAPHIC PROCESSOR

FIELD OF THE INVENTION

The present invention relates generally to computerized mapping systems and more particularly to a digital map system wherein a storage device stores generic digital map data, i.e., map data containing very little formatting information, and a cartographic processor generates maps utilizing the digital map data. The cartographic processor is capable of generating maps in a plurality of different formats, e.g., areas, sizes, features shown, resolutions, etc.

BACKGROUND OF THE INVENTION

The use of computers to store and then display or print maps is well known. According to contemporary methodology, such maps are typically scanned and then stored, in total, in a computer's memory such that they may later be retrieved for use, i.e., by printing or displaying the maps.

Of course, the maps which can be displayed or printed are strictly limited to the exact maps which are stored in the computer. Thus, it is not possible to define particular areas, resolutions, or features to be displayed for a particular map. All the computer really does is to merely provide the same data, generally in exactly the same format, as was originally associated with a particular scanned map.

However, as those skilled in the art will appreciate, it is often desirable to provide a map covering a different area (a subset of the original, scanned area), having a different resolution, or showing different features (a subset of the features originally scanned), from those predefined maps which are stored within a computers memory according to contemporary methodology.

For example, it might be beneficial to show only streets and power lines for use by a power company worker, to show only streets and water lines for use by a water utility worker, and to show only streets and gas lines for a gas company worker. Further, it may be beneficial to show high obstructions such as mountain tops, radio/television antennas, and tall buildings for use by aircraft pilots. Of course many other combinations of features may be desirable for various other purposes. Showing features which are not of particular interest to a user generally clutters the map, thereby making it more difficult to use. Thus, it would be beneficial to provide means for generating maps which cover a desired area, have a desired resolution, and show only those features which are of particular interest.

SUMMARY OF THE INVENTION

The present invention specifically addresses and alleviates the above-mentioned deficiencies associated with the prior art. More particularly, the present invention comprises a digital map system, the digital map system comprising a storage device for storing digital map data and a cartographic processor for generating maps utilizing digital map data from the storage device. Such digital map data comprises a listing or database of those features for which later presentation is desired, as well as the necessary parameters for displaying those features, such as the location and physical parameters associated therewith. For example, an electrical power line may be stored in a vector format, i.e., by storing the end points of contiguous line segments. Information regarding the features themselves, such as the voltage carried on the power lines, is preferably also stored.

The cartographic processor is configured to generate maps in a plurality of different formats.

The digital map system of the present invention preferably further comprises a directory of the maps which can be generated by the cartographic processor utilizing digital map data from the storage device. This allows a user to select from a list of maps, without having to specify the individual desired parameters thereof. Alternatively, the user may individually specify each desired parameter for a map to be displayed or printed. For example, the user could specify the size, resolution, area covered, and features to be shown in the map.

According to the preferred embodiment of the present invention, the digital map system further comprises a cache memory for temporarily storing previously generated maps. The previously generated maps are not permanently stored, but rather are temporarily stored since it is frequently the case that a recently printed or displayed map will be required again in the near future. This is in contrast to contemporary practice wherein all of each map, in its original format, is stored.

Of course, storing only the digital map data, rather than storing the entire map itself, substantially reduces the storage requirements, thereby allowing more information to be stored on a given system. This greatly enhances the utility of the virtual map store.

According to the preferred embodiment of the present invention the storage device stores Digital Terrain Elevation Data (DTED), a Digital Chart of the World (DCW), and a Digital Aeronautical Flight Information File (DAFIF). However, those skilled in the art will appreciate that other digital data may also be stored. This digital map data is preferably stored in a vector format. However, those skilled in the art will appreciate that various other formats for storing the digital map data are likewise suitable.

The cartographic process is preferably configured to generate maps utilizing a Postscript raster image processor. Those skilled in the art will appreciate that various other image processors are likewise suitable.

Further, the present invention preferably comprises a method for storing the digital map data in the storage device. The method for storing the digital map data comprises the steps of storing a latitude and a longitude of a selected reference point, defining an area relative to the selected reference point, tessellating the area so as to define a plurality of bins, selecting desired bins, and tessellating the desired bins so as to form further bins therein. The process of selecting desired bins and tessellating the desired bins so as to form further bins therein is repeated for all desired bins until the desired resolution is obtained. The digital map data is preferably stored within the storage device using higharchical frequency tessellation having tessellation of 256×256.

Desired data is associated with each bin at a desired resolution thereof. Information representative of a location of each bin and the bins associated data is stored in the storage device. In this manner, only the desired features and their locations are stored.

According to the preferred embodiment of the present invention, a semantic compressor system extracts desired cartographic information from a map. In this manner, only that information which is desired is stored in the storage device, thereby facilitating the storage of much larger maps in a storage medium of a given capacity. The semantic compressor system comprises a first storage device for storing data representative of the map. This is preferably the same storage device utilized to store map data for later display or printing. However, those skilled in the art will appreciate that a separate storage device may be associated with the semantic compressor system, if desired. At this point in the procedure, substantially all of the information associated with a particular map is stored in the first storage device. Thus, the step of storing data representative of the map in the first storage device preferably comprises merely scanning a map into the first storage device.

As those skilled in the art will appreciate, such scanning effects the storage of all graphic data represented on the map. Thus, all of the different features shown on the map, as well as any extraneous information such as blemishes, printing errors, or undesirable data such as features which will not later be utilized, are stored during this step.

A semantics extractor identifies the desired cartographic information and separates the desired cartographic information from the remaining date in the storage device.

The semantic extractor is thus capable of identifying desired cartographic information or map features among a clutter of undesired data. The desired features are defined by a user and include any cartographic features for which later use is contemplated.

A semantics compressor compresses the desired cartographic information. Those skilled in the art will appreciate that various algorithms are suitable for effecting such data compression. According to the preferred embodiment of the present invention, a tokenization scheme is utilized wherein a symbol or token representative of the desired data, and those features thereof for which later display is desired, is utilized. For example, the compressed data format may include a number which indicates a desired feature, such as a telephone pole, tall building, etc., and a data field within which the location of the feature, as well as the height thereof are stored. In this manner, storage requirements tend to be minimized.

A second storage device is preferably then used for storing the compressed cartographic information.

A semantics decompresser decompresses desired cartographic information from the second storage device, when needed. The semantics decompresser uses the stored compressed cartographic information to define a symbol and/or text to be printed or displayed. For example, when displaying an aircraft obstruction, the location data is used to place a desired symbol at the appropriate location on the map, and the height data is then printed next to the symbol.

Thus, according to the preferred embodiment of the present invention, a method for compressing cartographic data comprises the steps of storing data representative of the map in a first storage device, identifying the desired cartographic data and separating the desired cartographic data from the remaining data stored in the first storage device, compressing the desired cartographic information, and storing the compressed cartographic information in a second storage device, from which it may later be decompressed.

The digital map system preferably comprises a general purpose computer which is in communication with the storage device and the cartographic processor. The general computer accepts requests for specified maps, displays the maps on a CRT or the like, and facilitates printing of the maps by transmitting the roster image of the requested maps to a printer or the like. The general purpose computer also facilitates updating of the digital map data stored in the storage device, preferably, via mass media such as a hard disk, a laser disk, a magneto-optical disk, or a floppy disk. The general purpose computer optionally also facilitates updating of digital map data via the keyboard. However, those skilled in the art will appreciate that such updating will typically be accomplished via a map storage device since the quantity of data involved is typically too great for practical keyboard entry.

Thus, according to the present invention, a method is provided for storing and displaying or printing maps which contain only those features of interest, thereby avoiding undesirable clutter. The maps can cover any desired area, have a desired resolution, and be printed in any desired size or format.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description as set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

The virtual map store/cartographic processor of the present invention is illustrated in FIGS. 1 through 4 which depict a presently preferred embodiment thereof.

Figure 1:
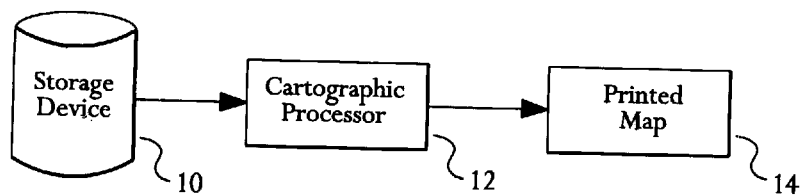
FIG. 1 is a block diagram of the map generation process according to the present invention.

Referring now to FIG. 1, the virtual map store/cartographic processor of the present invention generally comprises a storage device 10 within which cartographic data such as Digital Terrain Elevation Data (DTED), a Digital Chart of the World (DCW), and a Digital Aeronautic Flight Information File (DAFIF) are stored, using a vector format where possible. Data from the storage device 10 is used by the cartographic processor 12 to generate a printed map 14. Alternatively, the map may be displayed upon a CRT.

Figure 2:
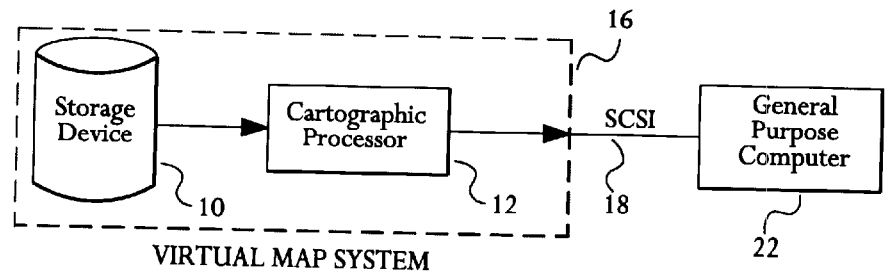
FIG. 2 is a block diagram illustrating control of the virtual map system of the present invention by a general purpose computer.

Referring now to FIG. 2, the storage device 10 and the cartographic processor 12 comprise the virtual map system 16 which communicates, preferably via Small Computer Systems Interface (SCSI) bus 18 with a general purpose computer 22.

The general purpose computer 22 is configured so as to accept requests for maps, display maps, facilitate the printing of maps, and also may be used for facilitating updating of digital map data stored in the storage device.

Figure 3:
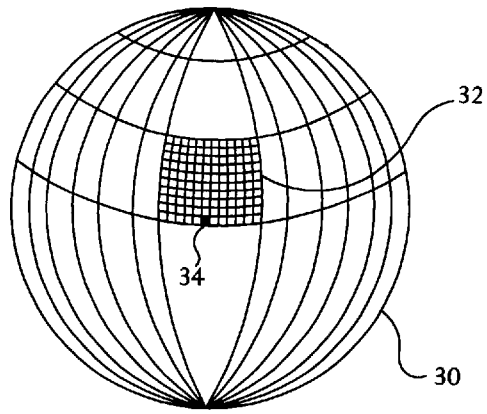
FIG. 3 graphically illustrates the iterated tessellation process used to store map data according to the present invention.

Referring now to FIG. 3, the tessellation process by which cartographic information is preferably stored within the storage device 10 is shown. The earth 30 is first divided into a plurality of squares 32.

According to the preferred embodiment of the present invention. The size of the squares is selected such that when each square is subdivided into 256×256 subsquares and each of those subsquares is divided into 256 sub-subsquares, then each sub-subsquare has a length on each side thereof of approximately 1 meter. Since 8 bits can represent a number up to 256, this scheme is well suited for computer applications.

According to the preferred embodiment of the present invention, this is accomplished by dividing 180 degrees of arc upon the earth's surface by 256 such that each square is approximately 0.7 degrees on each side. This makes each square approximately 78,131 meters on each side. Thus, each subsquare will be approximately 305 meters on each side and each sub-subsquare will be approximately 1.2 meters on each side.

In this manner, using a three layer tessellation, each hemisphere of the earth can be represented in 8 bits per 1.2 meter×1.2 meter square.

Since the earth's surface is not uniformly covered with features of interest, the tessellation process of the present invention is preferably frequency driven such that the highest resolution is only obtained where the density of desired features makes such resolution necessary.

According to the preferred embodiment of the present invention, a Varonoi tessellation is utilized. Those skilled in the art will appreciate that the Veroni tessellation comprises the iterative subdividing of a given area into a plurality of identical subunits, having the same in general shape as the original area. This process is repeated until the size of each unit is that which is desired.

Figure 4:
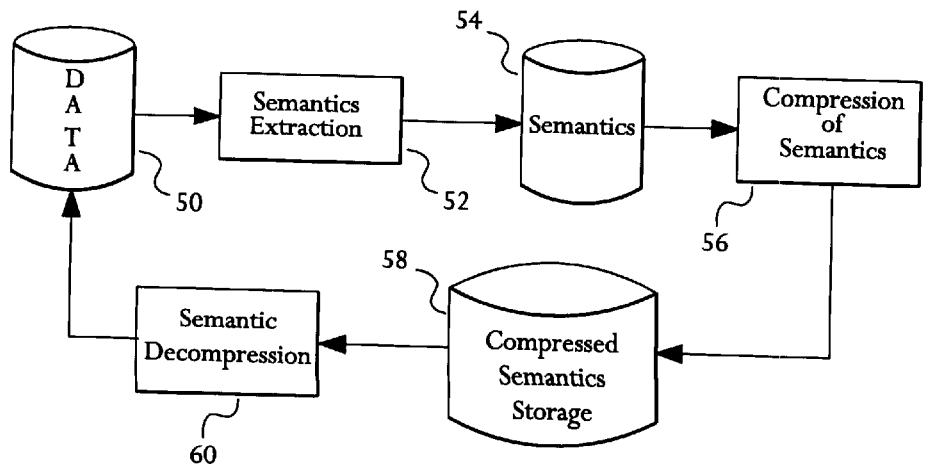
FIG. 4 is a block diagram of a semantic compressor system according to the present invention.

Referring now to FIG. 4, according to the preferred embodiment of the present invention, the semantic compressor system comprises a first storage device 50 for storing raw data representative of a map thereon. Typically, this raw data will comprise a stand raster image of a map. Semantic extraction 52 involves recognizing and isolating the desired features of the map which a user would like to have present in the data base. This process preferably comprises the recognition of desired features of the map, so as to provide semantics 54 which are representative of the desired features of the map data 50.

Next, compression of the semantics 56 takes place. This is preferably accomplished by placing the data in its most efficient form, typically by vectorizing any semantic information to the lowest degree of resolution for which it is determined to be useful and adding on any desired parameter or attribute information, such as the height of an aviation obstruction, for example. The compressed semantics is then stored on the second storage device 58 from which it may later be decompressed 60, optionally back into the first storage device 50, if desired. The decompressed semantic 60 may also be printed or displayed, as desired.

It is understood that the exemplary virtual map store/cartographic processor of the present invention described herein and shown in the drawings represents only a presently preferred embodiment of the invention. Indeed, various modifications and additions may be made with such embodiment without departing from the spirit and scope of the invention. For example, various means of storage are contemplated. Thus, the storage may not be limited to contemporary magnetic storage media, but rather may utilize high density storage media, such as holographic media. Further, the methodology for semantic extraction need not be limited to contemporary computation methodology, but rather may extend to artificial intelligence systems utilizing fuzzy logic, expert systems, and the like. Thus, these and other modifications and additions may be obvious to those skilled in the art may be implemented to adapt the present invention for use in a variety of different applications.

What is claimed is:

1. A digital map system comprising:
   a) a first storage device for storing digital map data in a plurality of formats;
   b) a semantics extractor for identifying and separating selected cartographic information from the digital map data in the first storage device, the semantics extractor being operative to extract only selected features within a map sector, the selected features being organized by commonality of semantic characteristics;
   c) a semantics compressor for compressing the selected cartographic information into formats requiring less storage space;
   d) a second storage device for storing the compressed cartographic information;
   e) a semantic decompressor for decompressing the compressed cartographic information; and
   f) a cartographic processor for generating maps utilizing the digital map data from the first storage device and the compressed cartographic information from the semantic decompressor, the cartographic processor being operative to generate maps in a plurality of formats corresponding to the digital map data stored in the first storage device and the decompressed cartographic information, the plurality of formats providing flexibility to a user with respect to which cartographic information is to be included.

2. The digital map system as recited in claim 1, further comprising a directory of the maps which can be generated by the cartographic processor utilizing digital map data from the storage device.

3. The digital map system as recited in claim 1, further comprising a cache memory for temporarily storing previously generated maps.

4. The digital map system as recited in claim 1, wherein the storage device has Digital Terrain Elevation Data (DTED), a Digital Chart of the World (DCW), and a Digital Aeronautical Flight Information File (DAFIF) stored therein.

5. The digital map system as recited in claim 1, wherein the digital map data is stored in a vector format.

6. The digital map system as recited in claim 1, wherein the cartographic processor is configured to generate maps utilizing a PostScript Raster Image Processor.

7. The digital map system as recited in claim 1, further comprising a general purpose computer in communication with the storage device and cartographic processor for accepting requests for maps, displaying maps, facilitating the printing of maps, and for facilitating updating of digital map data stored in the storage device.

8. The digital map system as recited in claim 1, wherein the digital map data is stored within the storage device using hierarchical frequency tessellation.

9. The digital map system as recited in claim 1, wherein the digital map data is stored within the storage device using hierarchical frequency tessellation having tessellation of 256×256.

10. A semantic compressor system for extracting desired cartographic information from a map, the semantic compressor system comprising:

a) a first storage device for storing data representative of the map;

b) a semantics extractor for identifying and separating the desired cartographic information from remaining data in the first storage device;

c) a semantics compressor for compressing the desired cartographic information into a desired format;

d) a second storage device for storing compressed cartographic information; and e) a semantic decompressor for the decompressing desired cartographic information from the second storage device.

11. A method for compressing cartographic data, the method comprising the steps of:

a) storing data representative of a map in a first storage device;

b) identifying and separating desired cartographic information from the remaining information stored in the first storage device;

c) compressing the desired cartographic information into a desired format;

d) storing the compressed desired cartographic information in a second storage device; and e) decompressing desired cartographic information from the second storage device.

12. A method for storing and retrieving digital map data, the method comprising the steps of:

a) storing map data from a map in a first storage device;

b) extracting selected cartographic information from the digital map data in the first storage device;

c) compressing the selected cartographic information;

d) storing the selected cartographic information in a second storage device;

e) decompressing the selected cartographic information from the second storage device; and f) generating maps utilizing the digital map data from the first storage device and the selected cartographic information.

* * * * *